United States Patent Office 3,842,022
Patented Oct. 15, 1974

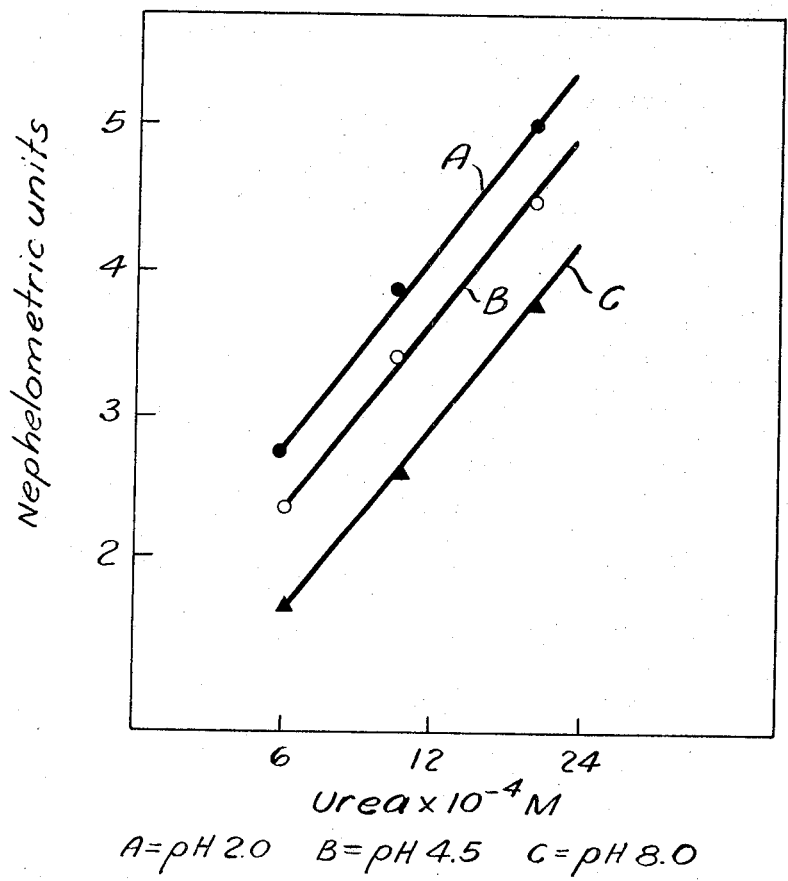

3,842,022
POLYMERIC ACRYLIC ACID-UREA COMPLEXES
AND PREPARATION
Samuel S. M. Wang, Indianapolis, Ind., assignor to The
Dow Chemical Company, Midland, Mich.
Filed Aug. 6, 1973, Ser. No. 386,243
Int. Cl. A61k 27/00; C08b 25/00; C08f 27/08;
C08g 22/02
U.S. Cl. 260—17.4 SG 4 Claims

ABSTRACT OF THE DISCLOSURE

Polymeric acrylic acid having a high molecular weight is reacted with urea by mixing the polymer with aqueous urea to form an insoluble inclusion compound consisting of about 1 gram of polymer to about 10 grams of urea. The process is useful in treating uremic animals. The product is useful as a slow release form of urea.

BACKGROUND OF THE INVENTION

Figure 2:
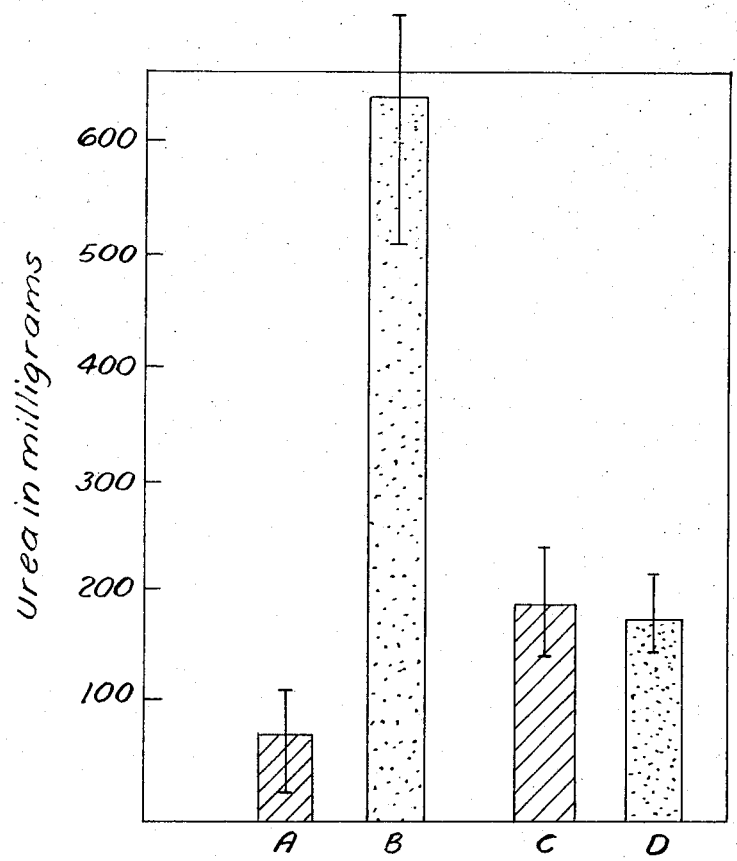

It is known that urea forms addition or inclusion compounds with various aliphatic compounds such as hydrocarbons, alcohols, halides, ketones, monocarboxylic acids, esters, ethers, amines and nitriles. These inclusion compounds, also known as adducts, have been described by W. Schlenk, Jr., Ann. 565, 204–240 (1949). The inclusion compounds differ from the stoichiometric compounds of urea with low-molecular weight mono- or dibasic acids (e.g., trichloroacetic acid, oxalic acid, malonic acid and succinic acid). In the inclusion compounds, the partner does not combine with urea in stoichiometric molar proportions excepting by chance, and the compounds do not follow the classical coordination concept. That this is not due to analytical errors has been shown repeatedly by independent nitrogen determinations, carbon analyses and determinations of loss in weight of the inclusion compounds on completed dissociation. In a homologous series, Schlenk has shown, the molar ratio of urea to the partner in inclusion compounds increases linearly with the length of the carbon chain. This has been shown with carboxylic acid-urea inclusion compounds of 4 carbon to 18 carbon monocarboxylic acids. That the inclusion compounds are not adsorption products, Schlenk has reported, follows from the fact that on evacuation of the less stable adducts, the vapor pressure remains constant until complete dissociation has occurred. In the case of monocarboxylic acids, Schlenk reported, the tendency toward dissociation increases with the decreasing number of carbon atoms. Schlenk postulated that there may be an upper limit (in molecular weight) beyond which adduct formation cannot occur. Adipic acid was found to form a stoichiometric compound with urea, whereas sebacic acid forms an adduct of the type wherein the sebacic acid lies in the central canal or lumen of the changed prismatic urea lattice, the cross section of which accommodates sebacic acid. Adducts of n-monocarboxylic acids with urea were reported having the following respective molar ratios of urea to partner: butyric, 4.0 average; pentanoic, 4.63; hexanoic, 5.44 average; heptanoic, 6.0; octanoic, 6.65; nonanoic, 7.62; decanoic, 8.23; undecanoic, 8.88; dodecanoic, 10.07; myristic, 11.28 average; palmitic, 12.8; and stearic, 14.1 average. Most of these adducts precipitate from a solution of urea and methanol. However, the prior art nowhere shows high molecular weight polymeric polycarboxylic acid inclusion compounds of urea or their utility.

SUMMARY OF THE INVENTION

It has now been discovered that colloidally water-soluble polymers of acrylic acid lightly crosslinked with a polyhydroxy compound having at least 3 and not more than 8 hydroxyl groups, wherein the hydrogen atoms of at least 3 hydroxyl groups are replaced with an unsaturated aliphatic radical having at least 2 carbon atoms, react with urea to form an inclusion compound. The inclusion compounds of these high molecular weight polymeric acrylic acids are crystalline materials which are poorly soluble in water and in polar and non-polar organic solvents. The ratio of interaction is about 1 part by weight of polymeric acrylic acid to about 10 parts by weight of urea, i.e., a proportion of about 12.8 moles of urea per mer unit of high molecular weight polymeric acrylic acid.

The high molecular weight polymeric acrylic acids react with urea *in vitro* and *in vivo* to form the inclusion compounds. That the reaction products are indeed inclusion compounds is indicated by the molar proportion of urea to mer of resin polymer, by equilibrium dialysis techniques, and by turbidimetric determinations. The formation of the inclusion compounds at various concentrations and pH's are observed in a linear relation nephelometrically. In uremic rats, it was found that the high molecular weight resinous polymeric acrylic acids combined with urea in the gastrointestinal track.

One form of the polymeric compositions used in the present invention contains as the active principle a colloidally water-soluble polymer of acrylic acid crosslinked with a polyhydroxy compound having at least 3 and preferably not more than about 8 hydroxyl groups, wherein the hydrogen atoms of at least three hydroxyl groups are replaced with unsaturated aliphatic radicals having at least 2 carbon atoms. Preferred radicals are those containing 2 to 4 carbon atoms, e.g., vinyl, allyl, crotyl, or other ethylenically unsaturated group. These unsaturated radicals may themselves contain other substituents, such as the methyl group. For example, compounds containing the methallyl radical are useful.

The crosslinker desirably comprises about 0.75% to 2.0%, and preferably about 0.75% to 1.5%, by weight, of the polymer of acrylic acid. Best results are obtained with about 1.0% by weight of these polyhydroxy crosslinking materials.

The polyhydroxy compounds useful as crosslinking materials and as contemplated in the present invention preferably contain 3 or more hydroxyl groups and may include the saccharides, for example, monosaccharides, such as glucose, fructose, mannose or galactose, and disaccharides, such as sucrose, maltose or lactose. Other useful polyhydroxy compounds include the polyhydroxy alcohols, such as glycerol, erythritol, dulcitol, mannitol, sorbitol and pentaerythritol. The unsaturated crosslinkers described above are all ethers but the use, as crosslinking materials, of unsaturated esters of the polyhydroxy compounds, such as the triacrylic acid ester of glycerol or acrylic acid esters of sucrose having from 3 to 8 acid residues is also feasible. Unsaturated ether esters may also be used, but as in the case of unsaturated esters are not preferred because of their tendency to hydrolyze in aqueous solutions. These crosslinking materials are chemicals with which the chemist is familiar.

The preferred crosslinking compounds are polyallyl sucrose or polyallyl pentaerythritol. The polyallyl sucrose and polyallyl pentaerythritol contemplated for use as the crosslinking agent desirably contain an average of at least 3 allyl groups for each molecule of sucrose or pentaerythritol. The allyl groups are substituted on the sucrose and pentaerythritol by means of ether linkages; in the case of sucrose a theoretical maximum of 8 allyl groups is possible. For best results the polyallyl sucrose should contain an average of 5 to 6 allyl ether groups per molecule of sucrose and the polyallyl pentaerythritol should preferably contain 4 allyl ether groups for each molecule of pentaerythritol (tetraallyl pentaerythritol), which is the maximum theoretically possible for pentaerythritol.

The formation of the crosslinked polymers of acrylic acid is accomplished by polymerizing acrylic acid, or a similar monomeric resin-forming material, with one of the aforementioned crosslinking agents in an inert solvent, preferably in the presence of a polymerization catalyst under autogenous pressure and in an inert atmosphere to inhibit oxidation. The reaction is carried out in the presence of an inert diluent which will not copolymerize with the reactants and which will not cause swelling of the polymerized product. Such diluents should preferably act as a solvent for the monomeric reactants but not the polymeric reaction product. These diluents include water, a liquid aromatic or aliphatic hydrocarbon, such as benzene, toluene, n-hexane or pentane; or an alcohol, such as ethanol, etc. The liquid hydrocarbons, such as benzene and toluene, are preferred. Preferably the diluent should be employed in a quantity sufficient to dissolve the reactants, but dissolution is not essential, as the polymerization may be conducted in an aqueous emulsion medium in accordance with standard polymerization practices, although this is not preferred. The polymerization catalyst may be one of the well-known class of free radical catalysts, such as the organic and inorganic peroxides, such as benzoyl peroxide, caproyl peroxide and sodium or hydrogen peroxides. The catalyst is normally employed in a concentration of about 0.1% to about 1.0%, although it may be as high as 2%, of the weight of the acrylic acid employed.

The polymerization of the acrylic acid and cross-linking agent is preferably carried out with simple agitation in a sealed vessel provided with simple wall-cooling at autogenous pressures. The reaction is an exothermic one and during the polymerization the temperature is desirably maintained between 20° and 70° C., preferably about 50° C. The reaction temperature is not critical, but if held much below 50° C. the rate of polymerization may be quite slow, whereas if the temperature is permitted to go much above 50° C., the exothermic reaction may proceed too rapidly. The polymerization is permitted to proceed as far toward completion as possible, the time required varying greatly with the reactants and other factors. If the polymerization is carried out in the presence of an inert diluent as described above, the progress of the reaction may be followed by periodically sampling the liquid phase and analyzing it for the presence of free monomer. In such case, the reaction is determined to be complete when the percentage of monomer reaches a minimum concentration. In practice, substantially all of the monomeric material is converted to the polymeric form.

When the polymerization has been completed, the reaction diluent or solvent and the unused catalyst are removed by distillation or filtration. The distillation may be conducted under vacuum. The resulting crosslinked polymer of acrylic acid is a white powder which is somewhat hydroscopic. The polymer is of a rather high molecular weight. While the molecules of the polymer possess graded molecular weights, the minimum molecular weight of the molecules is desirably in excess of 200,000, and preferably in excess of 300,000. The maximum molecular weight may vary over a considerable range, although as a practical matter the average molecular weight should not be so high that the crosslinked polymer forms a viscous gel, at a concentration of 3% in water, which exceeds 50,000 cps. (Brookfield) at 20° C.

The minimum degree of polymerization of the crosslinked polymer of acrylic acid which is suitable for employment in the invention may be determined by ascertaining the viscosity of an aqueous solution of the crosslinked polymer. This viscosity is determined by weighing 2.5 grams of the dry crosslinked polymer accurately to within ±0.005 gram. The weighed polymer is slowly sifted and dissolved into 500 ml. of distilled water in a Waring Blender to provide a 0.5% solution. During the addition of the polymer, the blender is operated at low speed. After adding all of the polymer, the blender is operated at its maximum speed for 3 minutes. The resultant solution is transferred to a 1-liter beaker and permitted to stand until all foam has broken. Sufficient concentrated ammonium hydroxide is added to the solution to bring the pH to 6.5–7.0. This normally requires about 2.5 ml. of concentrated ammonium hydroxide. The solution of the polymer is then stirred with a large stirrer at 250 r.p.m. for 30 seconds to thoroughly mix the ammonium hydroxide. The beaker containing the gel which forms is permitted to stand for 1 hour at 25° C. in a constant temperature bath, after which the gel is tested on a Brookfield viscometer, model LVF, employing a No. 4 spindle at 60 r.p.m. Under the conditions of this method the crosslinked polymer should have a minimum specific viscosity of 60 poises.

Particularly suitable colloidally water-soluble polymers of acrylic acid for use in the invention are made by the B. F. Goodrich Chemical Company and designated by the trademarks Carbopol-934, Carbopol-941, Carbopol-960 and Carbopol-961. The first two are in the free acid form and the last two are in the ammonium salt form. The products are colloidally water-soluble polymers of acrylic acid crosslinked with approximately 1% of polyallyl sucrose of varying molecular weights. The crosslinked polymers are produced by polymerizing acrylic acid monomer with about 1% of its weight of polyallyl sucrose having an average of about 5.8 allyl groups attached through ether linkages to each molecule of sucrose. The polymerization of the acrylic acid monomer is conducted in the presence of toluene diluent and 1% of benzoyl peroxide catalyst in a sealed reaction vessel in accordance with the process described above. After the polymerization has been completed, the toluene is removed by filtration, and the crosslinked polymer which is a white powder having a maximum particle size of 10 mesh and a bulk density of about 12 pounds per cubic foot, is then obtained. The exact molecular weight is unknown, but analysis shows that the product has an equivalent weight (molecular weight for each repeating unit) of about 77. The minimum molecular weight, as roughly determined from viscosity measurements, is about 200,000.

The viscosity of the polymers produced in accordance with the preceding paragraph is determined by the aforementioned procedure. If the specific viscosity is found to be in excess of 60 poises, it is satisfactory for employment in this invention. The crosslinked polymers are dry white powders which disperse in water to give, in a 1% aqueous suspension, a colloidal sol having a pH of about 3.0 or lower. The powder is slightly hygroscopic. At a pH of above 4.5 the polymer, while still colloidally soluble, forms a hydrophilic gel of high viscosity. From experiments conducted so far, it appears that maximum gelling of a 1% sol takes place at a pH of approximately 6.0. At this pH, the gel is so viscous that in going from the minimum viscosity at a pH of 3.0 or lower to the maximum viscosity at a pH of about 6.0, the viscosity value increases so dramatically that the viscosity cannot accurately be determined, although it is believed to be more than a thousandfold increase.

A desirable crosslinked acrylic acid polymer, containing 1% of polyallyl sucrose crosslinker, contemplated for use in the invention, was found, when dispersed to the extent of a 1% aqueous sol at 75° F., to give a pH of 3.0 and a viscosity of 24.0 centipoises. When the pH of this colloidal solution was adjusted to about 3.6 with dilute alkali, the viscosity increased to 264.0 centipoises. When the pH was further increased to about 4.3, the viscosity increased to about 6,500 centipoises. On increasing the pH to about 6.0, where maximum gelation is believed to occur, the resulting gel becomes firm and is so viscous that viscosity is almost impossible to measure. When the pH of the colloidal gel or sol is lowered, or increased to a highly alkaline value in excess of 9 or 10, the viscosity is observed to decrease. When the pH is reduced below 3.0 the viscosity is not materially lowered below the rather low value of 24 centipoises observed at this pH. The viscosity data reported were obtained by means of a Brookfield viscosimeter.

One form of the crosslinked acrylic acid polymer containing 1% of polyallyl sucrose crosslinker desirable for employment in the invention is a white dry powder, which does not have a melting point. Instead of melting, it changes color at about 190° C. and becomes quite dark at about 260° C. Within a relatively wide range of temperature, the material is stable so that it will withstand autoclaving, and it is not degraded by moderate amounts of acid or alkali. It has a specific gravity of 1.40 at 25° C. and a refractive index of 1.52 at the same temperature when compared to the "D" line of sodium. The material is substantially non-toxic, odorless, colorless, and it might be said to have a slightly sour taste. It is bland and causes no irritation. When the polymer is dispersed in water to the extent of a 1% sol, it is found to produce a solution having a pH of approximately 3.0.

The crosslinked acrylic acid polymers desirable for use in the invention are considered to be colloidally water-soluble, or "sol-forming," and are herein described as such. Although their aqueous sols may contain no suspended matter which settles upon standing, they are not true solutions in the crystalloidal sense and might be more accurately described as colloidal suspensions or solutions. Although none of the material will settle out upon standing, if subjected to ultra-centrifuging, most of this material, being colloidal in nature, may be separated from its colloidal solution or suspension. The aqueous sols give the characteristic "Tyndall effect" of aqueous colloidal dispersions.

Because of their lower viscosity when dissolved in water, it is preferred to use the colloidally water-soluble crosslinked polymers of acrylic acid in the acid form, rather than as an alkali-, alkaline-earth or other metal salt, or ammonium or other pharmaceutically acceptable salt. Moreover, in the presence of stomach acid, the salts are converted to the acid form. When a composition containing a colloidally water-soluble polymer of acrylic acid crosslinked with 1% of polyallyl sucrose, such as is described hereinabove, is administered orally to an animal, it passes almost immediately to the stomach, which normally has a pH of about 1.7 to 2, at least when comparatively empty. At such a pH (or in fact any pH below 3.0), the polymer imparts little viscosity to the stomach content, as little gelling occurs at this pH. For this reason it is preferred that the pH of the compositions be as close as convenient to this figure. In aqueous sols at this pH, the viscosity is only slightly higher than that of water. Upon passing the pylorus of the stomach and entering the duodenum, the increased pH results in a dramatic gelling phenomenon with a manifold increase in viscosity. At the same time that the aforementioned colloidally water-soluble polymer of acrylic acid gels, it acts to retain liquid in the intestinal tract. Indeed, a 1% gel of the polymer of pH 7.0 retained its water content in the face of centrifugation at a force equal to 20,000 times that of gravity. By the time the polymeric acrylic acid gets to the ileum, it has reacted with substantially all of the urea present, as appears below. The urea inclusion compound thereby formed passes from the intestinal tract and is eliminated without further incident.

DESCRIPTION OF THE PREFERRED EMBODIMENTS

The following procedures and examples further describe the invention and the manner and process of making and using it so as to enable the art skilled to make and use the invention, and set forth the best mode contemplated by the inventor of carrying out the invention.

Carbopol® 934, a high molecular weight colloidally water-soluble polymeric acrylic acid crosslinked with about 1% polyallyl sucrose and prepared as described above is reacted with urea to form a complex compound by mixing an aqueous sol of the polymer with an aqueous solution of urea. When a concentration of 50% urea is mixed with a suspension of resin of about 5% concentration, the inclusion compound then precipitates out. Precipitation is accelerated by adjusting the urea solution to a pH of about 2 to 4. At lesser concentrations of urea and polymer, the inclusion compound is precipitated by adding absolute ethanol to the aqueous reaction medium. By using an equilibrium dialysis cell technique and a nephelometric determination, it was determined that the complex is an inclusion compound. The formation of this complex at various concentrations and pH's was observed in a linear relation nephelometrically. The ratio of interaction is about one gram of polymer to about 10 times its weight of urea. In uremic rats, it was also found that this polymer combined with urea in the gastrointestinal tract.

Experimental

Assay of urea: a series of aqueous solutions containing from 2 to 32 mg. urea in aqueous solution was placed in a test tube, distilled water was added to adjust the volume to 5 ml., 5 ml. of urea nitrogen reagent (thiocarbazide) and 2 drops of 2% aqueous diacetylmonoxime were added and the test tube was heated in a water bath at 98°–100° C. for 12 minutes. The color developed was measured at 540 nm. using a Beckman DU spectrophotometer.

Nephelometric Determination

An absolute Light Scattering Photometer, 4–6210, American Instrument Company, Inc., Silver Spring, Md., was used in the determination of turbidity.

(A) In various concentrations of aqueous solutions containing 4, 8, 16 or 32 mg. of urea each (distilled water was added to make the total volume 5 ml.) 0.1 ml. of 1 N HCl was added to adjust the pH to 2.0. Then 5 ml. of an aqueous Carbopol® 934 suspension, equivalent to 2 mg. of polymer was added, the mixture was mixed on a shaker and measured nephelometrically.

(B) Same procedure as (A) was used except it was adjusted to pH 4.5.

(C) Same procedure as (A) was used except it was adjusted to pH 8.0.

Dialysis Tubing Method (A) 5 ml. of aqueous 1% Carbopol® 934 suspension was placed in 4 in. of dialysis tubing, and both ends were sealed. The tubing was placed in aqueous 0.8% to 2.9% urea solution in a 2-liter beaker and stirred overnight. The tubing was then rinsed with water and the urea content determined both inside and outside of the tubing. The amount of urea inside the dialysis tubing represents that "bound" to the polymer as an inclusion compound.

(B) The sealed dialysis tubing containing the polymer suspension and urea was dialyzed against water stirred overnight and the urea content both inside and outside of the dialysis tubing determined.

Dialysis Cell Equilibrium Method

A typical dialysis cell consists of two Plexiglas® blocks. The dialysis membrane (cellulose) was placed between the two blocks with compartments facing each other. The blocks were firmly held together. In one of the compartments, 5 ml. 1% Carbopol® 934 suspension was placed, and 5 ml. 20% urea solution in the other with adjusted pH. The entire assembly was then agitated for 12 hours and 24 hours, respectively. At the end of these intervals, triplicate samples of solutions of both sides were pipeted out with a syringe and the amount of urea was determined spectrophotometrically at 540 nm. by using diacetylmonoxime reagent.

TEST FOR UREMIC POISONING IN RATS

White male Wister (Harlan) rats, weighing between 250–300 grams were used. The rats were anesthetized with Metofane® and bilateral nephrectomys were performed to induce uremic poisoning. At 4 hours after surgery, 3 of the 6 rats operated on were dosed orally with 2 ml. 2% Carbopol® 934 in water. The remaining rats served as controls and were dosed orally with distilled water. 24-hour fecal samples were collected and assayed for urea. The ileum contents of all rats were removed and assayed for urea.

Results

Figure 1:
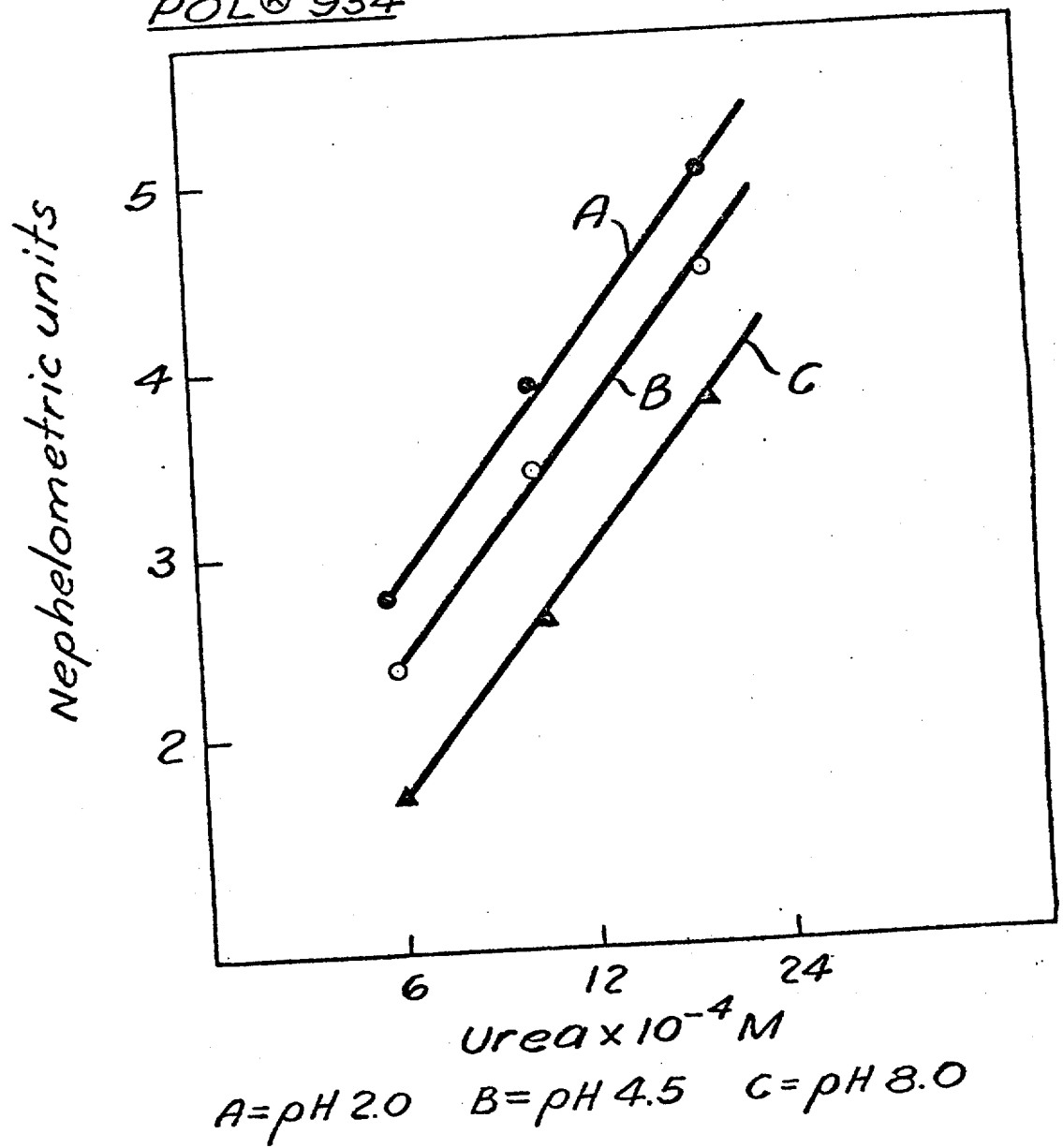
Figure 2:
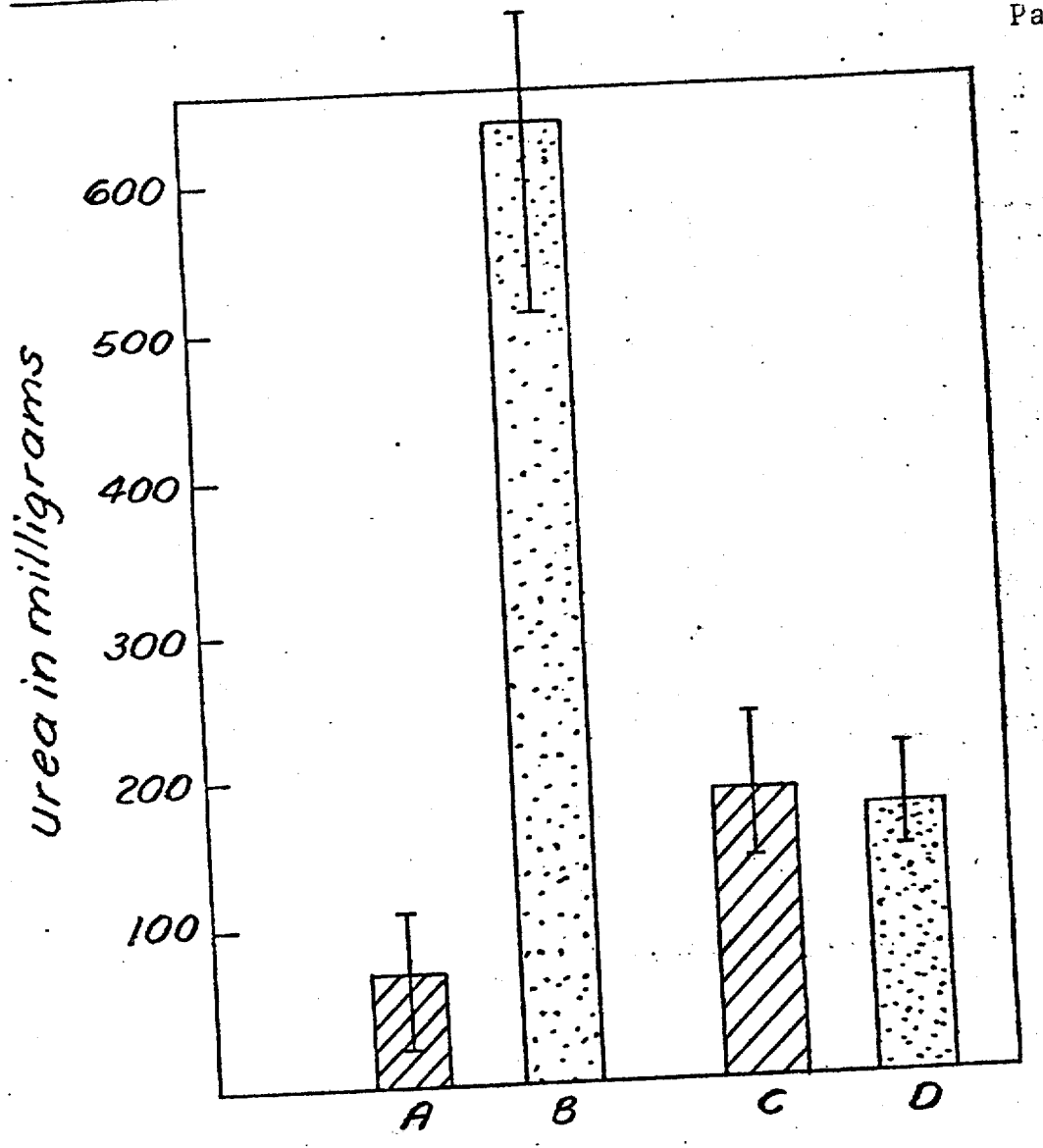

Results of the *in vitro* interaction between Carbopol® 934 and urea by nephelometric determination are presented in FIG. 1 and by dialysis technique are presented in the following table. The weight ratio of these two reactants was one of Carbopol® 934 and ten parts of urea, i.e., 12.8 moles of urea per mer of the polymer. The complex formed was an inclusion compound as determined by using reverse dialysis technique.

TABLE
[Determination of urea from dialysis experiments]

| I. Dialysis tubing method | | | II. Dialysis cell method | | |
|---|---|---|---|---|---|
| | Outside, percent | Inside, mg. | | 12 hrs., mg. | 24 hrs., mg. |
| A | 0.8 | 345 | D | 202 | 480 |
| B | 1.5 | 475 | E | 189 | 478 |
| C | 2.9 | 502 | F | 150 | 490 |
| Average | | 482 | Average | 180 | 483 |

Results of the *in vivo* studies in rats are presented in FIG. 2. There was no apparent difference in the amount of fecal urea from 24-hour samples for both treated and control rats, but the amount of urea in the contents of the ileum in treated animals was eight times greater than that of the control rats. One treated and two control rats were dead 48 hours after surgery. The remaining 3 rats all showed severe signs of uremic poisoning and were dead after 72 hours. It is known that animals which have had bilaterial nephrectomys usually die in several days. The short life span of the nephrectomized rats was therefore insufficient to show any substantial reduction in the fecal urea content of the treated nephrectomized rats but the amount of urea in the contents of the ileum was sufficient to show a substantial difference.

The polymers employed in the method of the invention are advantageously formulated as compositions comprising a pharmaceutically-acceptable adjuvant and a preponderance of water to form a colloidal solution of the polymer. Such compositions generally contain from about 0.1 to about 3, to about 5 percent by weight of polymer. Concentrate compositions adapted for further dilution with pharmaceutically-acceptable adjuvants before use generally contain from about 5 to about 10 percent by weight of polymer. The colloidal aqueous solutions of polymer are stable for prolonged periods and retain their desirable properties during extended storage under a variety of storage conditions. The term "pharmaceutically-acceptable adjuvant" is herein employed to refer to those adjuvants conventionally employed in the administration of compounds to animals, which are substantially non-toxic at dosages of polymer compositions, and which do not interfere with the urea-removing effects, so that the beneficial properties of the methods and compositions of the invention are not vitiated by effects attributable to the adjuvants. The procedures for selection of particular pharmaceutically-acceptable adjuvants to be employed in particular situations are well known to those skilled in the formulation of compositions to be administered to animals. They can also comprise finely divided inert solids, preferably water-soluble inert solids such as lactose, glucose, maltose, dextrose, gelatin and the like and flavoring materials.

In general, advantageous results are obtained with compositions comprising a colloidal aqueous solution of polymer whether in the normal acid form or as the ammonium salt or other pharmaceutically-acceptable salt form.

The inclusion compounds of urea are also useful as a source of urea. For such use in aqueous systems, the polymer-urea inclusion compound is added to warm water in the desired amount, whereupon the urea diffuses slowly out of the inclusion compound to give a solution of urea also containing a colloidal solution of polymer.

What is claimed is:

1. An inclusion compound of urea and a colloidally water-soluble polymer of acrylic acid crosslinked with approximately 1% of a polyhydroxy compound having at least 3 and preferably not more than about 8 hydroxyl groups, wherein the hydrogen atoms of at least 3 hydroxyl groups are replaced with allyl groups, the inclusion compound having a molar proportion of urea to polymer mer units of about 12.8 to 1.

2. The inclusion compound of Claim 1 wherein the polymer is a polymer of acrylic acid crosslinked with 1% of polyallylsucrose.

3. A method for sequestering urea from an aqueous medium which comprises contacting an aqueous solution of urea with an aqueous suspension of a colloidally water-soluble polymer of acrylic acid crosslinked with a polyhydroxy compound having at least 3 and preferably not more than about 8 hydroxyl groups, wherein the hydrogen atoms of at least 3 hydroxyl groups are replaced with allyl groups, the polymer being present in proportion to provide substantially one mer unit per substantially 12.8 moles of urea whereby an inclusion compound of the polymer and urea is formed.

4. The method of Claim 3 wherein the polymer of acrylic acid is crosslinked with about 1% by weight of polyallylsucrose.

References Cited

UNITED STATES PATENTS

| | | | |
|---|---|---|---|
| 2,520,715 | 8/1950 | Fetterly | 260—77.5 C |
| 2,798,053 | 7/1957 | Brown | 424—81 |
| 3,085,081 | 4/1963 | Bailey | 260—77.5 C |
| 3,235,523 | 2/1966 | Schurz | 260—29.6 N |
| 3,308,020 | 3/1967 | Wolf et al. | 424—81 |
| 3,485,915 | 12/1969 | Gerstein | 424—81 |

OTHER REFERENCES

Chem. Abst., vol. 54, 5459b, Braun et al., "Urea-Inclusion Compounds of Acrylic Acid N-Alkyl Esters."

WILLIAM H. SHORT, Primary Examinr

E. WOODBERRY, Assistant Examiner

U.S. Cl. X.R.

260—29.6 N, 77.5 C, 80 R, P; 424—81, 322

PO-1050
(5/69)

UNITED STATES PATENT OFFICE
CERTIFICATE OF CORRECTION

Patent No. 3,842,022      Dated October 15, 1974

Inventor(s) Samuel S. M. Wang

It is certified that error appears in the above-identified patent and that said Letters Patent are hereby corrected as shown below:

The two sheets of drawings (copies attached) which were submitted with the original patent application were not included with the issued patent.

Signed and sealed this 28th day of January 1975.

(SEAL)
Attest:

McCOY M. GIBSON JR.
Attesting Officer

C. MARSHALL DANN
Commissioner of Patents

A - Ileum urea content in control rats.
B - Ileum urea content in treated rats.
C - Urea in 24 hrs. fecal sample in control rats.
D - Urea in 24 hrs. fecal sample in treated rats.